Patented Oct. 22, 1929

1,732,330

UNITED STATES PATENT OFFICE

CAMILLE DREYFUS, OF NEW YORK, N. Y., AND GEORGE SCHNEIDER, OF CUMBERLAND, MARYLAND, ASSIGNORS TO CELANESE CORPORATION OF AMERICA, A CORPORATION OF DELAWARE

MANUFACTURE OF PRODUCTS HAVING A BASIS OF CELLULOSE DERIVATIVES

No Drawing. Application filed November 21, 1925, Serial No. 70,706, and in Great Britain December 24, 1924.

This invention relates to the manufacture of moulding powders having a basis of cellulose acetate, or other esters or ethers of cellulose, and to the production of pressed or moulded masses, articles or objects therewith.

In particular the invention concerns the manufacture and application of moulding powders having a basis of cellulose acetate, but it is applicable also to the manufacture and application of moulding powders having a basis of other organic or inorganic esters of cellulose or of ethyl, methyl or benzyl cellulose or other cellulose ethers (all hereinafter included in the term substitution derivations of cellulose). Mixtures of any of such cellulose derivatives may likewise be employed as basis of the moulding powders.

According to the invention the cellulose derivative or derivatives in pulverulent form is first wetted or treated with water, then incorporated with one or more plasticizing or softening agents, camphor substitutes or high boiling solvents (hereinafter all included in the term softeners) and a volatile organic diluent or diluents, not being a solvent of the cellulose derivative or derivatives employed and the diluent or diluents and water are thereafter evaporated from the treated powder.

It has been found that by this means it is possible to obtain moulding powders capable of giving much more homogeneous pressed or moulded masses, articles or objects than have hitherto been obtainable with moulding powders having a basis of cellulose derivatives such as referred to.

Any known or suitable high boiling solvents, camphor substitutes or plasticizing or softening agents all hereinafter included in the term softeners, may be employed in carrying out the invention, for instance triacetin, paratoluene sulphonamide, isomeric xylene low-carbon alkyl sulphonamides, diethyl phthalate, triphenyl phosphate, tricresyl phosphate, mannol, resorcin diacetate, mirbane oil or any others which are high boiling solvents, plasticizers or softening agents for the cellulose derivatives. Mixtures of any of such subsances may of course be employed.

Any suitable volatile organic diluents may be employed which are non-solvents for the cellulose derivative or derivatives used, for instance benzol, toluol, gasolines or others.

The softening agent or agents are preferably applied in solution or admixture with the volatile diluent or diluents to the powdered damp or wetted cellulose derivative or derivatives, but they may be applied separately therefrom.

According to requirements or the class of product or article in view, any usual or suitable additions may be incorporated or associated with the moulding powders, for instance resins, stabilizers, such as urea or urea derivatives, dyes, pigments, effect materials, filling substances and so forth, and where such additions are capable of application in solution or mixture with the volatile diluent they may be thus applied together or contemporaneously with the softening agent or agents, but they may be incorporated with the moulding powder after treatment with the water, volatile diluent and softening agent and evaporation as referred to, and in the case of additions such as filling materials, pigments, dyestuffs and the like these will usually be incorporated with the powder after said treatment and evaporation.

The moulding powders prepared as above set forth may be moulded under heat and pressure in the known way into masses, blocks, slabs, or articles or objects of any shape or form in presses, moulds, dies, or otherwise, with or without employment of cores, backings, supports or the like, all such masses, articles or objects being hereinafter included in the term moulded objects, which term likewise includes articles such as gramophone records.

The following is one example of the manner in which the invention may be carried out in practice; it being understood that this is given only by way of illustration and can be varied widely without departing from the invention.

Example 100 lbs. of cellulose acetate ground to a fine powder are introduced into a mixing machine provided with a heating jacket, and about an equal weight of water is poured in and mixed thoroughly for about half an hour therewith. Then there is added to the damp mixture about 30 lbs. of triacetin in solution in about 100 lbs. of benzol and the whole is mixed thoroughly for about two hours. Heat is then gently applied to the jacket until all or practically all of the benzol and most of the water is driven off and the mixture is then taken from the mixer and dried off in drying cupboards or the like.

The resulting powder, with or without incorporation with other additions can then be moulded under heat and pressure to form moulded objects of any kind.

It is understood that instead of triacetin and benzol any other appropriate softeners and volatile diluents may be employed and that the invention is in no way limited to the particular quantities of water, softening agent and diluent specified which may be varied up or down widely according to requirements. Also that other cellulose derivatives such as referred to may be employed wholly or partly instead of cellulose acetate.

We claim:

1. A process for the manufacture of molding powders which comprises mixing a substitution derivative of cellulose in pulverulent form with water, thereafter thoroughly mixing therewith a softening agent and a volatile diluent which is a non-solvent for the cellulose derivative and then removing water and diluent from the resulting mixture by evaporation.

2. A process for the manufacture of molding powders which comprises mixing a substitution derivative of cellulose in pulverulent form with water, thereafter thoroughly mixing therewith a softening agent and benzol and then removing water and benzol from the resulting mixture by evaporation.

3. A process for the manufacture of molding powders which comprises mixing a substitution derivative of cellulose in pulverulent form with water, thereafter thoroughly mixing therewith triacetin and a volatile diluent which is a non-solvent for the cellulose derivative and then removing water and diluent from the resulting mixture by evaporation.

4. A process for the manufacture of molding powders which comprises mixing a substitution derivative of cellulose in pulverulent form with water, thereafter thoroughly mixing therewith triacetin and benzol and then removing water and benzol from the resulting mixture by evaporation.

5. A process for the manufacture of molding powders which comprises mixing an organic derivative of cellulose in pulverulent form with water, thereafter thoroughly mixing therewith a softening agent and a volatile diluent which is a non-solvent for the cellulose derivative and then removing water and diluent from the resulting mixture by evaporation.

6. A process for the manufacture of molding powders which comprises mixing a cellulose ester in pulverulent form with water, thereafter thoroughly mixing therewith a softening agent and a volatile diluent which is a non-solvent for the cellulose ester and removing water and diluent from the resulting mixture by evaporation.

7. A process for the manufacture of molding powders which comprises mixing a cellulose ester in pulverulent form with water, thereafter thoroughly mixing therewith a softening agent and benzol and removing water and benzol from the resulting mixture by evaporation.

8. A process for the manufacture of molding powders which comprises mixing a cellulose ester in pulverulent form with water, thereafter mixing therewith triacetin and a volatile diluent which is a non-solvent for the cellulose ester and removing water and diluent from the resulting mixture by evaporation.

9. A process for the manufacture of molding powders which comprises mixing a cellulose ester in pulverulent form with water, thereafter mixing therewith triacetin and benzol and removing water and benzol from the resulting mixture by evaporation.

10. A process for the manufacture of molding powders which comprises mixing cellulose acetate in pulverulent form with water, thereafter thoroughly mixing therewith a softening agent and a volatile diluent which is a non-solvent for the cellulose acetate and removing water and diluent from the resulting mixture by evaporation.

11. A process for the manufacture of molding powders which comprises mixing cellulose acetate in pulverulent form with water, thereafter thoroughly mixing therewith a softening agent and benzol and removing water and benzol from the resulting mixture by evaporation.

12. A process for the manufacture of molding powders which comprises mixing cellulose acetate in pulverulent form with water, thereafter thoroughly mixing therewith triacetin and a volatile diluent which is a non-solvent for the cellulose acetate and removing water and diluent from the resulting mixture by evaporation.

13. A process for the manufacture of molding powders which comprises mixing cellulose acetate in pulverulent form with water, thereafter thoroughly mixing therewith triacetin and benzol and removing water and benzol from the resulting mixture by evaporation.

14. Molding powders consisting of a substitution derivative of cellulose, a softening agent and a trace of a volatile diluent which is a non-solvent for the cellulose derivative, the whole being in powdered form.

15. Molding powders consisting of an organic derivative of cellulose, a softening agent and a trace of a volatile diluent which is a non-solvent for the cellulose derivative, the whole being in powdered form.

16. Molding powders consisting of a cellulose ester, a softening agent and a trace of a volatile diluent which is a non-solvent for the cellulose ester, the whole being in powdered form.

17. Molding powders consisting of cellulose acetate, a softening agent and a trace of a volatile diluent which is a non-solvent for the cellulose acetate, the whole being in powdered form.

In testimony whereof, we have hereunto subscribed our names.

CAMILLE DREYFUS.
GEORGE SCHNEIDER.